(12) United States Patent
Proschka

(10) Patent No.: US 6,948,359 B2
(45) Date of Patent: Sep. 27, 2005

(54) TIRE PRESSURE MONITORING SYSTEM

(75) Inventor: Roland Proschka, Russelsheim (DE)

(73) Assignee: General Motors Corporation, Detroit, MI (US)

( * ) Notice: Subject to any disclaimer, the term of this patent is extended or adjusted under 35 U.S.C. 154(b) by 28 days.

(21) Appl. No.: 10/414,746

(22) Filed: Apr. 16, 2003

(65) Prior Publication Data

US 2003/0205081 A1    Nov. 6, 2003

(30) Foreign Application Priority Data

May 4, 2002    (DE) ............................... 102 20 083

(51) Int. Cl.[7] ........................................... B60C 23/02
(52) U.S. Cl. ..................................... 73/146.5; 340/440
(58) Field of Search .......................... 73/146, 146.2, 73/146.3, 146.4, 146.5, 146.8; 340/440, 442

(56) References Cited

U.S. PATENT DOCUMENTS 5,463,374 A    10/1995   Mendez et al. ............. 340/442
6,463,798 B2 *  10/2002   Niekerk et al. ............ 73/146.2

FOREIGN PATENT DOCUMENTS

| DE | 4205911 A1  | 9/1993  |
|----|-------------|---------|
| DE | 69326356 T2 | 1/2000  |
| DE | 19921178 A1 | 11/2000 |
| EP | 0982159 A2  | 3/2000  |
| EP | 1108568 A2  | 6/2001  |

* cited by examiner

Primary Examiner—Michael Cygan
Assistant Examiner—Andre Allen
(74) Attorney, Agent, or Firm—Christopher DeVries

(57) ABSTRACT

For a wheel-related monitoring of the air pressure according to the invention, a tire pressure monitoring system is provided for a vehicle which in each case comprises an air pressure sensor, one for each vehicle wheel, which is connected to a control unit with an optical and/or acoustic output unit, wherein the air pressure sensor is associated with the respective vehicle wheel in such a way that a measuring value produced by the air pressure sensor together with a wheel-related coding (C) is transmitted to the control unit.

30 Claims, 1 Drawing Sheet

TIRE PRESSURE MONITORING SYSTEM

TECHNICAL FIELD

The invention concerns a tire pressure monitoring system for a vehicle in each case with an air pressure sensor intended for any vehicle which is connected to a control unit with an optical and/or acoustic output unit.

BACKGROUND OF THE INVENTION

The correct adjustment of the tire pressure in the tires of motor vehicle wheels is especially important in many respects. On the one hand, excessively high or low air pressure leads to elevated wear of the tires so that the vehicle tires must be replaced prematurely. This involves high costs. On the other hand, in the case of excessively low air pressure in the vehicle tires, tire life may be impacted because the tires, especially the sides of the tires, are subjected to increased flexing. Excessive flexing in this case leads to excessive heating in the interior of the tire and therefore affects the sidewall of the tire. This also results in a decrease in the strength of the tire, which may lead to a flat tire. The user of the vehicle must therefore regularly check the air pressure of the vehicle tires and correct it if necessary. However, this is frequently neglected for various reasons. Therefore, tire air pressure monitoring systems have been developed in which each vehicle tire is assigned an air pressure monitoring device which automatically measures the air pressure in the vehicle tire and reports a deviation from the nominal pressure to the driver of the vehicle via a suitable control unit. Such air pressure monitoring devices, for example, can be arranged in the tire in question, vulcanized into the rubber, or adhered or arranged in the air valve of the tire or in the rim.

For example, from EP 0 391 922 B1 it is known that a tire pressure sensor can be provided for vehicles with a pressure switch actuated by the tire pressure and attached to the periphery of the rim of the vehicle radially to the wheel axle. A short distance from it in the region of the tire pressure sensor on the wheel suspension of the vehicle a signal pickup is mounted which senses high frequency vibration in the tire pressure sensor when it passes by the vehicle wheel upon each rotation. The signal pickup is connected to an evaluation circuit with a warning indicator connected to it which emits a warning signal in the case of low pressure in a tire.

The disadvantage here is that a signal pickup such as a detector mounted in the region of the vehicle suspension is always exposed to dirt and moisture. Furthermore, in the region of the wheel suspension, the metal construction parts may have a disturbing influence on the high frequency vibrations between the tire pressure sensor and the signal pickup and transmit incorrect measured values of the tire pressure.

From DE 196 18 658 A1, for example, an air pressure control system for vehicles is known in which each vehicle tire is assigned an air pressure monitor installed, for example, in the tire rubber or in the valve. These devices have a transmitter which transmits the data to a corresponding receiver in a contactless manner. A central unit evaluates the data from the air pressure monitor together with data from additional sensors measuring the wheel rpm and generates a warning signal for the vehicle driver when the pressure falls below a certain minimum. The receiver in this case is arranged in a place in the vehicle not shown in detail.

The disadvantage in this case is that only warning notifications or warning signals representing all vehicle tires together are emitted.

SUMMARY OF THE INVENTION

The present invention has the objective of devising an air pressure monitoring system for vehicle tires with an air pressure sensor provided for each vehicle wheel and connected to a control unit with an optical and/or acoustic output unit, making possible improved monitoring of the air pressure.

This problem is solved according to the invention for an air pressure monitoring system of the type mentioned above by the fact that an air pressure sensor is assigned to each vehicle wheel in such a way that a measured value determined by the air pressure sensor is transmitted to the control unit in a wheel-related code.

Such a wheel-related monitoring of the air pressure based on the measured values determined by the air pressure sensor and a corresponding wheel-related code makes possible a rapid and simple identification of the position of the vehicle wheel involved. Due to the transmission of the air pressure values together with the wheel-related code, radio receivers arranged on the vehicle in question can be safely avoided.

A central radio receiver is preferred for receiving the air pressure values provided in the wheel-related code. Depending on the type and design of the air pressure monitoring systems, the central radio receiver is preferably integrated into the control unit.

Alternatively or additionally to evaluating the wheel-related code by means of the control unit, this unit can be positioned so that it is visible from the outside on a valve corresponding to the vehicle wheel in question. In this way a simple identification of, for example, a tire displaying a deficiency or an excess of air pressure is made securely possible by a simple visual inspection. Moreover, costly radio receivers arranged in the immediate vicinity of the vehicle wheel and thereby wheel-related for localization of the positions representing the tire in question can be safely omitted.

The wheel-related code is preferably stored as information in the control device. By comparison of the wheel-related code received by the control device with the stored code, a rapid and secure identification of the position of the corresponding vehicle wheel is made possible. Based on the analysis of the measured values or the air pressure value corresponding to the wheel-related code, a statement concerning the state of the tire is securely possible.

Preferably, the wheel-related mounting when the vehicle wheel is mounted is stored as information and/or updated in the control device. Such an updating or change in the wheel-related code as a function of the mounting of the vehicle wheels makes it possible to output site-specific warnings or notifications regarding the corresponding defective or ready-to-operate vehicle wheels.

The wheel-related code is preferably designed as a symbol, a numeric code and/or a color code. For example, the wheel-related code in the case of a color code is designated by a red identifier for the left front vehicle wheel, by a green identifier for the right front vehicle wheel, a yellow identifier for the left rear vehicle wheel and a blue identifier for the right rear wheel. Further identification, such as a white identifier, can be provided for a spare tire. Alternatively to the color code, the numeric code may be designed as an alphanumeric combination. The wheel-related code in this case is stored as information in the control device.

Preferably, the output device is designed for outputting optical and/or acoustic wheel-related notifications. In the case of identification of an impermissibly high or impermissibly low air pressure for one of the vehicle wheels, a warning signal indicating the defect to the driver can be emitted. Depending on the type and design of the output device, the warning signal, for example, can be output in the form of a notification on a visual display. Alternatively, an acoustic signal can be emitted in the form of a notification via a speaker. Instead of the warning signal, after evaluation of the received air pressure values, a notification can also be output concerning the operational readiness of the tire or tires.

Alternatively or additionally, the output unit is designed for optical and/or acoustic outputting of all the wheel-related codes and/or the air pressure values. Depending on the design of the output unit, the driver can read the wheel-related code and the corresponding air pressure value in the form of a notification, for example, in the form of a bar graph on a display. Alternatively, an acoustic notification can be emitted via a speaker in the vehicle.

Preferably, an input unit is provided for inputting the wheel-related codes. In particular in the case of a change in the positions of the vehicle wheels, the operator of the vehicle can store the current wheel-related codes and arrangement of the corresponding wheels via the input unit in the control device. For this purpose, the output unit and the input unit are preferably designed as a multifunctional display, especially as a touch viewing screen. As an alternative to a touch screen, the input unit may be designed in the form of a button or a switch. For this purpose, depending on the nature of the wheel-related code, the color code can be input accordingly, via a switch or via a touch screen. For example, by pressing the color identifier white once, by pressing the color identifier red twice, by pressing the color identifier blue three times, etc., it can be input into the control device as wheel-related coding.

The advantages achieved with the invention can be seen especially in the fact that by assigning an air pressure sensor to each vehicle wheel by means of a wheel-related code which is transmitted with the measured value or the air pressure value determined by the air pressure sensor to the control unit, an automatic tire pressure monitoring system is made possible which can dispense with radio receivers arranged locally in the immediate vicinity of the air pressure sensor. Furthermore, by evaluation of the wheel-related coding and the air pressure value by means of the control unit, an especially simple wheel-related air pressure monitoring which allows for changes of the wheel arrangement on the vehicle is made possible.

BRIEF DESCRIPTION OF THE DRAWINGS

Examples of embodiment of the invention are explained in more detail with reference to the drawings in which.

DESCRIPTION OF THE PREFERRED EMBODIMENT

Figure 1:
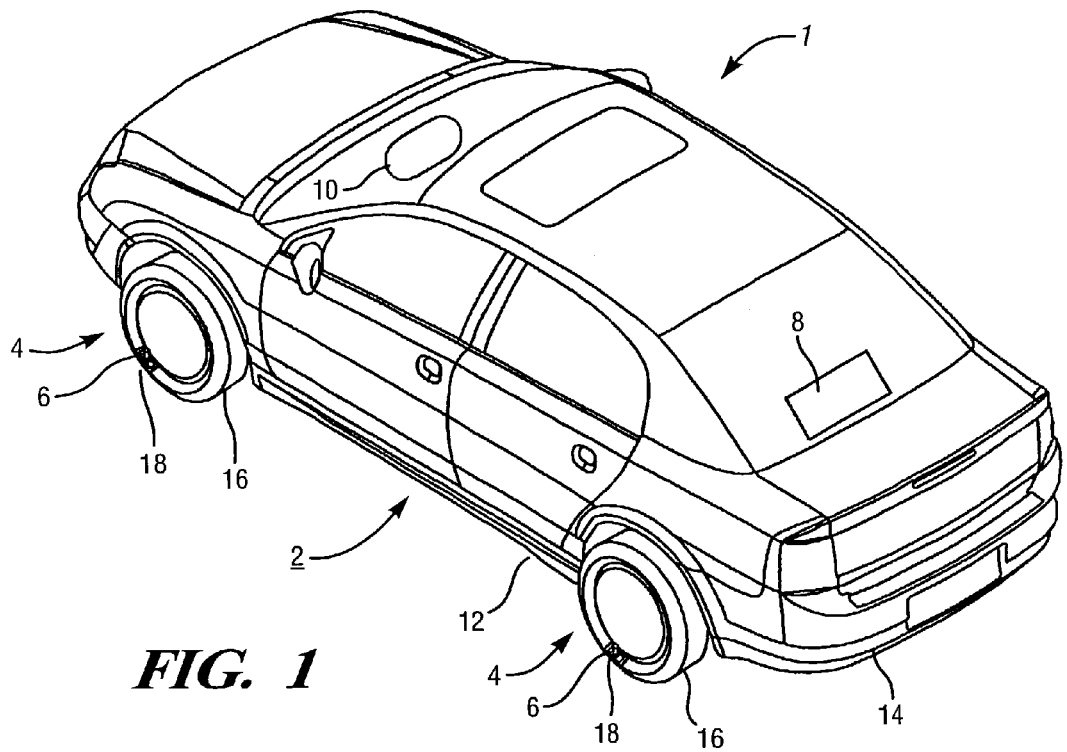
FIG. 1 shows schematically in perspective view a vehicle with a tire pressure monitoring system.

FIG. 1 shows a vehicle 1 with a tire air pressure monitoring system 2. The tire air pressure monitoring system 2 includes an air pressure sensor 6 for each vehicle wheel 4. As an example, the tire pressure monitoring system 2 in FIG. 1 is described with reference to the left front and left rear vehicle wheel 4 of the vehicle 1.

In addition, the tire air pressure monitoring system 2 includes a control unit 8. Depending on the type and structure of the air pressure monitoring system 2, the control unit 8 can be located in the trunk or in the front inside the vehicle 1. The control unit 8 is also connected to an optical and/or acoustic output unit 10. The output unit 10 in this case, depending on the type and design, can be designed as a touch screen which is preferably arranged near the driver, especially in the instrument panel in the front part of the vehicle 1.

The vehicle wheel 4 in each case is partially surrounded by the wheel guard cover 12 which is part of the vehicle body 14. The wheel guard cover 12 is preferably made of a nonmetallic plastic or rubber material. A tire belonging to the vehicle wheel 4 in question has a valve 18 for inflating the tire 16.

Figure 2:
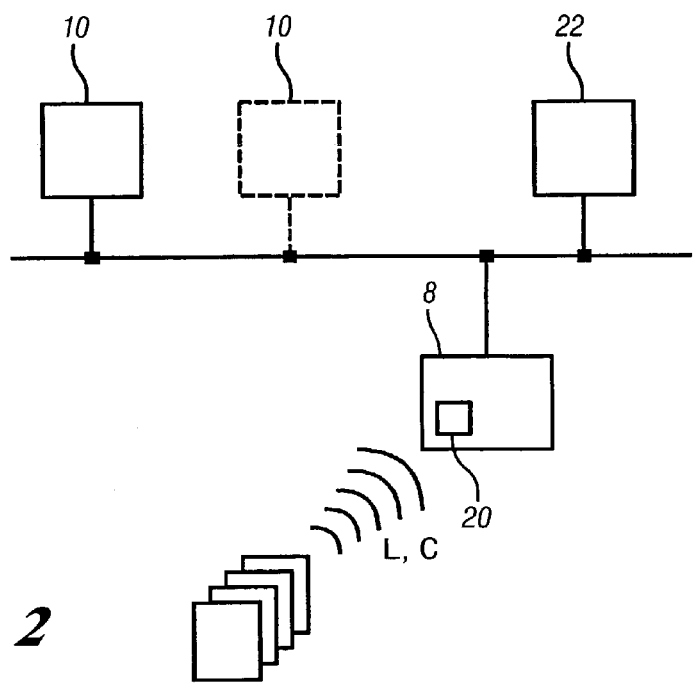
FIG. 2 shows a circuit diagram of the air pressure monitoring system in FIG. 1.

The valve 18 is preferably arranged with the smallest possible battery-operated air pressure sensor 6 which at certain time intervals checks the air pressure in the vehicle tires 16. The air pressure sensor 6 is provided with a sender, not shown in detail, which transmits the determined air pressure values L to the control unit 8. The air pressure sensor 6 in this case is designed in such a way that, in addition to transmitting the air pressure value L, it also transmits the code C characterizing the vehicle wheel 4 in question to the control unit 8 such as is shown as an example in FIG. 2. For this purpose, the communications protocol of the air pressure sensor 6 in each case includes a code C representing the corresponding vehicle wheel 4 and the corresponding air pressure value L.

A central radio receiver 20 is provided to enable receiving the air pressure value L associated with the wheel-related code C for the vehicle tire 16. The central radio receiver is preferably integrated in the control unit 8. To monitor and process the air pressure values L by means of the control unit 8 for the vehicle wheel 4 in question, the air pressure values L registered by the air pressure sensor 6 at certain time intervals are transmitted with the corresponding wheel-related code C continuously to the central radio receiver 20.

The control unit 8 evaluates the data received from the air pressure values L and the corresponding wheel-related code C and compares it with the stored nominal air pressure values $L_{nom}$ of the vehicle tire 16 in question. If the presently registered air pressure value L of the vehicle tire 16 deviates from a preassigned tolerance range of the preassigned nominal air pressure $L_{nom}$, then the control unit 8 sends a notification to the output unit 10 arranged in the vehicle interior, preferably on the instrument panel of the vehicle 1.

Depending on the nature and adjustment of the output unit 10, the notification is transmitted as an optical and/or acoustic warning signal or operating signal. In this way, the driver receives information concerning air pressure changes especially quickly.

In addition, based on the wheel-related code C transmitted with the air pressure value L, the driver receives information on the air pressure variation of the wheel 4 in question. For this purpose, the wheel-related code C received from the central radio receiver 20 is compared with a code C'stored in the control unit 8 which is coordinated with the position of one of the vehicle tires 4. If the received code C agrees with the stored code C', then, in addition to information concerning the air pressure variation, information is also sent concerning the position of the corresponding vehicle wheel 4.

Depending on the type and design of the output unit 10, for example, in the case of an acoustic design as a speaker unit or in the case of an optical design as an image screen unit, air pressure values L and the wheel-related code C are output as an acoustic notification or as a graphic indication. Thus, in the case of graphic indications on an image screen unit, for example, the air pressure value L in the form of bar graphs can be provided with a corresponding indication for the wheel-related code C and/or the position of the vehicle wheel 4 in question.

In order to update the coordination of the wheel-related code C with the position of the vehicle wheels 4 in question, the wheel-related code C is stored or updated at the time of mounting of the vehicle wheels 4 as information in the control unit 8. For this purpose, an input unit 22 is provided for inputting the wheel-related code C or C'. As the input unit 22, for example, a switch or a pushbutton may be used. Alternatively, the input unit 22 may be designed in combination with the output unit 10 as a multifunctional display, especially a touch screen.

In order to update the position of the vehicle wheels 4 with the corresponding wheel-related code C in the manner of a learning routine, the wheel-related code C is input via the input unit 22. For example, the wheel-related code C is input by actuating the input unit 22 designed as a pushbutton. For this purpose, for example, on the one hand, the mounting sequence of the vehicle wheels 4 is input in the form of an instruction. Based on the consecutive mounting of the vehicle wheels 4, e.g., first vehicle wheel 4 left front, then right front, left rear, right rear and finally the spare wheel, then, on the other hand the corresponding wheel-related code C is stored in the control unit 8, e.g. code red for the left front vehicle wheel (=press button once), code green for the right front wheel (=press button twice), code yellow for left rear wheel (=press button three times), code blue for the right rear wheel (=press button 4 times) or code white for the spare (=press button five times).

Alternatively to a wheel-related code C designed as a color code, this may also be designed as a simple code or a numeric code. Instead of the automatic identification of the vehicle wheel 4 in question on the basis of the code C stored in the control unit 8 in the simplest variant of the tire pressure monitoring system 2, the wheel-related code C transmitted with the air pressure value L is sent acoustically and/or optically to the output unit 10. The user of the vehicle 1 will be able to localize the corresponding vehicle wheel 4 on the basis of this externally visible wheel-related code C arranged on the valve 18 corresponding to it. Both in the case of automatic identification of the vehicle wheel 4 in question or in the case of a visual inspection by the driver himself of the valve 18, the corresponding vehicle wheel 4 can be identified by the driver in the case of an operationally unsuitable air pressure value in order to take measures assuring an operationally suitable air pressure value.

What is claimed is:

1. A tire pressure monitoring system for a vehicle comprising one air pressure sensor for each vehicle wheel, each air pressure sensor being connected to a control unit with an optical and/or acoustic output unit, wherein each air pressure sensor is associated with each respective vehicle wheel such that a measuring value produced by the air pressure sensor together with a wheel-related coding (C) is transmitted to the control unit, and the wheel-related coding (C) is arranged to be visible on the respective vehicle wheel, wherein an input unit is provided to receive user input associating the wheel-related coding (C, C') with respective vehicle wheel position in memory of said control unit.

2. The tire pressure monitoring system of claim 1, wherein a central radio receiver is provided for receiving the air pressure values (L) with the wheel-related coding (C).

3. The tire pressure monitoring system of claim 2, wherein the central radio receiver is integrated in the control unit.

4. The tire pressure monitoring system of claim 1, wherein a wheel-related coding (C') is deposited as information in the control unit.

5. The tire pressure monitoring system of claim 4, wherein the wheel-related coding (C, C') during assembly of the vehicle is actualized as information in the control unit.

6. The tire pressure monitoring system of claim 4, wherein the wheel-related coding (C, C') is designated as a symbol, a numeric code and/or a color code.

7. The tire pressure monitoring system of claim 4, wherein the output unit is designed to output the optical and/or acoustic wheel-related coding (C, C') and/or the air pressure values (L).

8. The tire pressure monitoring system of claim 4, wherein an input unit is provided to input the wheel-related coding (C, C').

9. The tire pressure monitoring system of claim 8, wherein the output unit and the input unit are designed as a multifunctional display.

10. The tire pressure monitoring system of claim 1, wherein the output unit is designed to output an optical and/or acoustic wheel-related warning signal.

11. The tire pressure monitoring system of claim 1, wherein the output unit is designed to output each measuring value according to its corresponding wheel-related coding (C).

12. The tire pressure monitoring system of claim 11 wherein the wheel-related coding (C) is a display property.

13. The tire pressure monitoring system of claim 12, wherein the wheel-related coding (C) is a color.

14. The tire pressure monitoring system of claim 13, wherein the output unit is designed to optically display measuring values in a bar graph, wherein each bar of the graph has a size property indicating the measuring value and a color indicating the wheel-related coding (C).

15. The tire pressure monitoring system of claim 13, wherein the output unit and an input unit are designed as a multifunctional display, and the input unit is designed to permit a user to deposit wheel-related coding (C') as information in the control unit by actuating an input mechanism associated with a screen region displaying the corresponding wheel-related coding (C).

16. A tire pressure monitoring system for a vehicle comprising one air pressure sensor for each vehicle wheel, each air pressure sensor being connected to a control unit with an optical and/or acoustic output unit, wherein each air pressure sensor is associated with each respective vehicle wheel such that a measuring value produced by the air pressure sensor together with a wheel-related coding (C) is transmitted to the control unit, and the wheel-related coding (C) is arranged to be visible on the respective vehicle wheel, wherein the output unit is adapted to communicate the wheel-related coding (C) in association with information relating to air pressure of the respective vehicle wheel.

17. The tire pressure monitoring system of claim 16, wherein a central radio receiver is provided for receiving the air pressure values (L) with the wheel-related coding (C).

18. The tire pressure monitoring system of claim 17, wherein the central radio receiver is integrated in the control unit.

19. The tire pressure monitoring system of claim 16, wherein a wheel-related coding (C') is deposited as information in the control unit.

20. The tire pressure monitoring system of claim 19, wherein the wheel-related coding (C, C') during assembly of the vehicle is actualized as information in the control unit.

21. The tire pressure monitoring system of claim 19, wherein the output unit is designed to output the optical and/or acoustic wheel-related coding (C, C') and/or the air pressure values (L).

22. The tire pressure monitoring system of claim 19, wherein an input unit is provided to input the wheel-related coding (C, C').

23. The tire pressure monitoring system of claim 22, wherein the output unit and the input unit are designed as a multifunctional display.

24. The tire pressure monitoring system of claim 19, wherein the wheel-related coding (C, C') is designated as a symbol, a numeric code and/or a color code.

25. The tire pressure monitoring system of claim 16, wherein the output is designed to output an optical and/or acoustic wheel-related warning signal.

26. The tire pressure monitoring system of claim 16, wherein the output unit is designed to output each measuring value according to its corresponding wheel-related coding (C).

27. The tire pressure monitoring system of claim 26, wherein the wheel-related coding (C) is a display property.

28. The tire pressure monitoring system of claim 27, wherein the wheel-related coding (C) is a color.

29. The tire pressure monitoring system of claim 28, wherein the output unit is designed to optically display measuring values in a bar graph, wherein each bar of the graph has a size property indicating the measuring value and a color indicating the wheel-related coding (C).

30. The tire pressure monitoring system of claim 29, wherein the output unit and an input unit are designed as a multifunctional display, and the input unit is designed to permit a user to deposit wheel-related coding (C') as information in the control unit by actuating an input mechanism associated with a screen region displaying the corresponding wheel-related coding (C).

* * * * *